United States Patent [19]

Clark et al.

[11] Patent Number: 5,045,293

[45] Date of Patent: Sep. 3, 1991

[54] NOVEL CRYSTALLINE ALUMINOPHOSPHATES AND RELATED COMPOUNDS

[75] Inventors: David M. Clark; Ronald J. Dogterom, both of Amsterdam, Netherlands

[73] Assignee: Shell Oil Company, Houston, Tex.

[21] Appl. No.: 523,676

[22] Filed: May 15, 1990

[30] Foreign Application Priority Data

Jun. 23, 1989 [GB] United Kingdom ............... 8914469

[51] Int. Cl.$^5$ .............................................. C01B 25/36
[52] U.S. Cl. .................................... 423/305; 502/208; 208/46
[58] Field of Search ............... 423/305, 306, 277, 279, 423/326, 328, 329; 562/214, 208; 208/46

[56] References Cited

U.S. PATENT DOCUMENTS 4,310,440 1/1982 Wilson et al. ...................... 423/305

FOREIGN PATENT DOCUMENTS 132708 2/1985 European Pat. Off. .
293920 10/1985 European Pat. Off. .
158976 12/1988 European Pat. Off. .

Primary Examiner—R. Bruce Breneman

[57] ABSTRACT

Crystalline aluminophosphates and related compounds having in the as-synthesized anhydrous form the chemical composition: $m^1R(Al_qP_x)O_2$, wherein R represents ethylenediamine, wherein $m^1 = 0.01$–$0.33$
$q = 0.30$–$0.60$
$x = 0.30$–$0.60$ and wherein $q + x = 1$ and which have a distinct X-ray diffraction pattern.

The compounds can be prepared from a forming solution or gel comprising a source of aluminum, a source of phosphorus, a source of ethylenediamine and optionally a source of at least one component X, wherein the appropriate forming components are initially present in specific molar ratios and which mixture is kept at elevated temperature for a period of time sufficient to produce a crystalline aluminophosphate or related compound followed by separating off the crystalline product obtained and drying, and which may subsequently be calcined.

12 Claims, No Drawings

NOVEL CRYSTALLINE ALUMINOPHOSPHATES AND RELATED COMPOUNDS

FIELD OF THE INVENTION

The present invention relates to novel crystalline aluminophosphate compositions and a process for preparing such aluminophosphate compositions.

BACKGROUND OF THE INVENTION

Crystalline aluminophosphate compositions are well known materials which find a promising reception in industry as new generations of molecular sieves and catalyst carriers as well as catalysts. For instance, in U.S. Pat. No. 4,310,440, the preparation of various crystalline aluminophosphates is described from reaction mixtures containing inter alia organic templating agents including tetrapropylammonium hydroxide, quinuclidine, t-butylamine and ethylenediamine.

Classes of thes materials comprise compositions crystallized in the $AlPO_4$, $SAPO_4$ (siliconaluminophosphate), $MeAPO_4$ (metalloaluminophosphate) and $ElAPO_4$ (non-metal substituted aluminophosphate) families.

It has now been found that novel crystalline aluminophosphates and related compounds, e.g. of the $AlPO_4$-, $SAPO_4$- and $MeAPO_4$-type can be prepared from reaction gels or solutions when use is made of the appropriate forming components and a certain organic diamine compound in specific molar ratios.

SUMMARY OF THE INVENTION

The present invention relates to crystalline aluminophosphates having in an as-synthesized anhydrous form a chemical composition comprising: $m'R(X_nAl_qP_x)O_2$, wherein R represents ethylenediamine, X represents one or more elements which can be substituted for Al and/or P, wherein m' = 0.01–0.33
n = 0–0.40
q = 0.30–0.60
x = 0.30–0.60
and wherein n+q+x = 1, and having an X-ray diffraction pattern containing at least the following lines:

| d(A) | Intensity |
| --- | --- |
| 11.3 ± 0.2 | s |
| 4.19 ± 0.1 | vs |
| 3.97 ± 0.1 | w–m |
| 3.77 ± 0.05 | w–m |
| 3.65 ± 0.05 | m |
| 3.56 ± 0.05 | m–vs |
| 3.17 ± 0.03 | w–m |
| 3.12 ± 0.03 | m–s |
| 2.99 ± 0.03 | m–s |
| 2.81 ± 0.03 | w |

In particular, the present invention relates to aluminophosphates and related compounds having the chemical composition as described hereinabove, wherein m' = 0.05–0.20
n = 0–0.30
q = 0.35–0.60 and
x = 0.35–0.60.

DESCRIPTION OF THE PREFERRED EMBODIMENTS

Element X can be substituted for aluminum and/or phosphorus in the crystalline aluminophosphates and related compounds according to the present invention. X can suitably be one or more of beryllium, magnesium, titanium, manganese, iron, cobalt, zinc, vanadium, nickel, chromium, silicon, lithium, boron, gallium, germanium and arsenic. Typically, element X will be one or more of magnesium, titanium, manganese, iron, cobalt, zinc, nickel, silicon, gallium or germanium, and preferably one or more of magnesium, titanium, manganese, iron, cobalt and silicon.

It should be noted that the expression "ethylenediamine" as used throughout this specification includes lower alkyl substituted ethylenediamines as well as promoter forms of ethylenediamine and its lower alkyl derivatives.

In the event that n > 0 it will be appreciated that the as-synthesized anhydrous form of the crystalline aluminophosphates and related compounds according to the present invention also contains an appropriate charge-balancing cation such as a proton or a protonic form of R as described hereinbefore.

An example of a novel crystalline aluminophosphate according to the present invention and belonging to the $AlPO_4$-class has in the as-synthesized anhydrous form the following chemical composition:

$0.11R(Al_{0.5}P_{0.5})O_2$ having an X-ray diffraction pattern as given in Table I.

The present invention also relates to a process for preparing novel crystalline aluminophosphates as well as related compounds as defined hereinbefore from a forming solution or gel comprising a source of aluminum, a source of phosphorus, a source of ethylenediamine and, optionally, a source of at least one component X, which mixture is kept at elevated temperature for a period of time sufficient to produce a crystalline aluminophosphate or related compound followed by separating out the crystalline product obtained and drying, in which solution or gel the various components are initially present in the following molar ratios:

$0.10 < R:Al_2O_3 < 0.65$
$X:Al_2O_3 = 0–2$
$P:Al_2O_3 = 0.3–1.3$
$H_2O:Al_2O_3 = 30–500$, wherein X and R have the meanings as defined hereinbefore.

The crystalline aluminophosphates and related compounds according to the present invention are preferably prepared from a forming solution or gel in which the various components are initially present in the following molar ratios:

$0.15 < R:Al_2O_3 < 0.60$
$X:Al_2O_3 = 0–2$
$P:Al_2O_3 = 0.4–1.25$
$H_2O:Al_2O_3 = 35–320$.

Crystalline aluminophosphates and related compounds according to the present invention are normally prepared from forming solutions or gels at a temperature between 80° C. and 175° C., in particular between 100° C. and 165° C. The use of aqueous forming solutions or gels is preferred.

The process according to the present invention can be carried out at autogenous pressure as well as at an elevated pressure. Normally, the novel crystalline aluminophosphates and related compounds will be produced when the forming solution or gel has been kept under the appropriate conditions for a period of time allowing the proper structure to be formed.

Preferably, the process according to the present invention is carried out for a period of time ranging between 18 hours and 144 hours, in particular between 24 and 96 hours.

Examples of suitable aluminum sources comprise aluminium oxide, such as gibbsite, boehmite, pseudo-boehmite and aluminum alkoxides, such as aluminum isopropoxide. Also mixtures of various aluminum sources can be suitably applied. Preference is given to the use of boehmite and, in particular, pseudo-boehmite.

Suitable phosphorus sources comprise phosphorus acids and derivatives thereof such as esters, phosphorus oxides, phosphates and phosphites, preferably ortho-phosphoric acid. Also mixtures of phosphorus sources can be applied.

Examples of suitable sources of X comprise the appropriate chlorides, iodides, bromides, nitrates, sulfates and acetates, preferably acetates, as well as oxides.

If desired, the crystalline aluminophosphates or related compounds produced can be calcined after drying to produce the desired calcined substantially R-free aluminophosphates or related compounds.

It has been found that agitation can advantageously be applied to produce the desired crystalline aluminophosphates or related compounds from the forming solution or gel.

The novel crystalline aluminophosphates and related compounds according to the present invention can suitably be used as molecular sieves, catalysts or as catalyst carriers in the operation of various catalytic processes. If desired, one or more (catalytically) active species, in particular protons and/or precursors thereof and/or one or more metal(s) (compounds) of Group III and/or the transition metals and/or rare earth metals and/or precursors thereof, can be incorporated into the crystalline aluminophosphates and related compounds according to the present invention.

They can be incorporated by well-known techniques such as, for example, impregnation and ion-exchange.

The invention will now be illustrated by the following Examples which are for illustration and are not to be construed as limiting the invention.

EXAMPLE I

A crystalline $AlPO_4$ was prepared by mixing 9.8 grams of pseudo-boehmite, 15.4 grams of 85% $H_3PO_4$, 2 grams of ethylenediamine and 45.1 grams of water to form a mixture having a pH between 2 and 3. This mixture was consequently maintained at 120° C. for 72 hours until a crystalline compound was obtained.

After synthesis the crystalline compound produced was separated from the reaction mixture by filtration, water washed, and dried at 120° C.

The crystalline compound obtained had in the anhydrous form the following chemical composition:

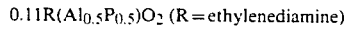

0.11R(Al$_{0.5}$P$_{0.5}$)O$_2$ (R = ethylenediamine)

and an X-ray diffraction pattern containing at least the lines as given in Table I below.

TABLE I

| d (A) | Intensity |
|---|---|
| 11.4 | s |
| 8.0 | w-m |

TABLE I-continued

| d (A) | Intensity |
|---|---|
| 7.5 | w-m |
| 6.0 | w-m |
| 4.19 | vs |
| 3.97 | m |
| 3.77 | w-m |
| 3.65 | m |
| 3.56 | vs |
| 3.18 | w-m |
| 3.12 | m-s |
| 2.99 | m-s |
| 2.96 | w-m |
| 2.81 | w-m |

EXAMPLE II

A crystalline $AlPO_4$ was prepared in an experiment which was carried out in a substantially analogous manner as described in Example I, except that the reaction was carried out at 160° C. for 72 hours and using 39.1 grams of water.

The crystalline $AlPO_4$ obtained had in the anhydrous form the following chemical composition:

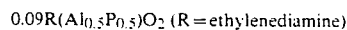

0.09R(Al$_{0.5}$P$_{0.5}$)O$_2$ (R = ethylenediamine)

and an X-ray diffraction pattern containing at least the lines as given in Table II hereinbelow.

TABLE II

| d (A) | Intensity |
|---|---|
| 11.2 | s |
| 7.9 | w-m |
| 7.4 | w |
| 6.0 | w-m |
| 4.18 | vs |
| 3.96 | w-m |
| 3.76 | w-m |
| 3.65 | w-m |
| 3.55 | vs |
| 3.16 | w-m |
| 3.13 | m-s |
| 2.99 | m-s |
| 2.95 | w-m |
| 2.81 | w-m |

EXAMPLE III

A crystalline $AlPO_4$ was prepared in an experiment which was carried out in a substantially analogous manner as described in Example I, except that the reaction mixture contained 9.2 grams of boehmite, 15.4 grams of 85% $H_3PO_4$ and 45.7 grams of water and was carried out at 120° C. for 72 hours.

The crystalline $AlPO_4$ obtained had in the anhydrous form the following chemical composition:

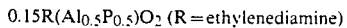

0.15R(Al$_{0.5}$P$_{0.5}$)O$_2$ (R = ethylenediamine)

and an X-ray diffraction pattern containing at least the lines as given in Table III hereinbelow.

TABLE III

| d (A) | Intensity |
|---|---|
| 11.4 | vs |
| 6.0 | w |
| 4.19 | m |
| 3.97 | w |
| 3.76 | w |
| 3.65 | w |
| 3.56 | w-m |
| 3.17 | w |

TABLE III-continued

| d (A) | Intensity |
|---|---|
| 3.12 | w-m |
| 2.99 | w-m |
| 2.95 | w |
| 2.81 | w |

What is claimed is:

1. Crystalline aluminophosphate compounds comprising in an as-synthesized anhydrous form a chemical composition: $m'R([X_n]Al_qP_x)O_2$, wherein R represents ethylenediamine, and wherein $m' = 0.01-0.33$
  $q = 0.30-0.60$
  $x = 0.30-0.60$ and wherein $q + x = 1$,
and wherein said crystalline aluminophosphates have an X-ray diffraction pattern containing at least the following lines:

| d(A) | Intensity |
|---|---|
| 11.3 ± 0.2 | s |
| 4.19 ± 0.1 | vs |
| 3.97 ± 0.1 | w-m |
| 3.77 ± 0.05 | w-m |
| 3.65 ± 0.05 | m |
| 3.56 ± 0.05 | m-vs |
| 3.17 ± 0.03 | w-m |
| 3.12 ± 0.03 | m-s |
| 2.99 ± 0.03 | m-s |
| 2.81 ± 0.03 | w |

2. The crystalline aluminophosphate compounds of claim 1 wherein
  $m' = 0.05-0.20$
  $q = 0.35-0.60$ and
  $x = 0.35-0.60$.

3. The crystalline aluminophosphate compounds of claim 1 wherein said crystalline aluminophosphate compounds additionally comprise one or more active species.

4. The crystalline aluminophosphate compounds of claim 3 wherein the catalytically active species comprise protons and/or precursors thereof and at least one compound of a metal selected from the group consisting of, a transition metal, rare earth metal and precursors thereof.

5. A process for preparing the crystalline aluminophosphate compounds of claim 1 which comprises mixing an aluminum compound, a phosphorus compound, and ethylenediamine in the molar ratios:

$0.10 < R:Al_2O_3 < 0.65$
  $P:Al_2O_3 = 0.3-1.3$
  $H_2O:Al_2O_3 = 30-500$ to form a mixture, heating said mixture at a temperature in the range of from about 80° C. to about 175° C. for a period of time sufficient produce a crystalline aluminophosphate product, recovering the crystalline product obtained, and drying said product.

6. The process of claim 5 wherein said initial molar ratios are:

$0.15 < R:Al_2O_3 < 0.60$
  $P:Al_2O_3 = 0.4-1.25$
  $H_2O:Al_2O_3 = 35-320$.

7. The process of claim 5 wherein the mixture is kept for a period of time ranging between 18 and 144 hours under crystal-forming conditions.

8. The process of claim 5 wherein said aluminum compound is selected from the group consisting of aluminum oxide, boehmite and pseudo-boehmite.

9. The process of claim 8 wherein said aluminum compound is pseudo-boehmite.

10. The process of claim 5 wherein said phosphorus compound is selected from the group consisting of phosphorus acids and/or esters thereof, phosphorus oxides, phosphates and phosphites.

11. The process of claim 10 wherein said source of phosphorus is phosphoric acid.

12. The process of claim 5 wherein said crystalline product obtained is calcined following drying.

* * * * *